May 20, 1969

W. V. CHILDS 3,445,292

THERMALLY REGENERABLE HYDROGEN HALIDE FUEL CELL

Filed Feb. 10, 1964

INVENTOR.
W. V. CHILDS
BY *Young & Quigg*

ATTORNEYS

United States Patent Office 3,445,292
Patented May 20, 1969

3,445,292
THERMALLY REGENERABLE HYDROGEN
HALIDE FUEL CELL
William V. Childs, Bartlesville, Okla., assignor to Phillips
Petroleum Company, a corporation of Delaware
Filed Feb. 10, 1964, Ser. No. 343,634
Int. Cl. H01m 27/06
U.S. Cl. 136—86     5 Claims

ABSTRACT OF THE DISCLOSURE

An apparatus for an integral, thermally-regenerable fuel cell having a hollow, cylindrical, hydrogen-permeable, membrane centrally positioned in a vessel; a portion of the membrane being surrounded by an electrolytic material and metallic cathode for an electrochemical reaction between hydrogen and a halogen to produce electrical energy. A heating means is provided for heating one zone of the vessel to dissociate the hydrogen halide contained therein into hydrogen and halogen for the fuel and oxidant necessary for the electrochemical reaction.

---

This invention relates to an improved electrochemical process and apparatus therefor. In another aspect, this invention relates to an electrochemical process and apparatus therefor wherein the products of the electrochemical process are thermally converted to feed materials for the electrochemical process.

Presently employed conventional methods of generating electrical energy are known to be relatively inefficient. When electrical energy is generated from the heat of a chemical reaction, a fuel is generally oxidized by air and the chemical energy of the fuel converted into heat and mechanical energy. The heat and mechanical energy are then employed in gas turbines or steam turbines connected to generators to so provide electrical energy. The overall efficiency of the conversion of the chemical energy of the fuel into electrical energy is considerably less than about 50 percent. To avoid this inefficiency, it has been suggested that fuel cells be employed to convert the chemical energy of the fuel directly into electrical energy without the intermediate conversion of the fuel energy into heat and mechanical energy.

A fuel cell basically comprises an electrolyte and two electrodes and is designed to generate electric current by means of an electrochemical reaction between fuel, such as hydrogen, and an oxidant, such as air, when power is demanded of the cell by an external load. The efficiency of the fuel cell would be greatly enhanced if an effective method for converting the chemical products of the electrochemical reaction into recycled fuel and oxidant was provided.

Accordingly, an object of my invention is to provide an improved electrochemical process and apparatus therefor.

Another object of my invention is to provide an electrochemical process and apparatus wherein the products of the electrochemical process are thermally converted to feed materials for the electrochemical process.

Another object of my invention is to provide a thermally regenerable electrochemical process and apparatus wherein the feed materials to the electrochemical reaction zone comprise hydrogen and a halogen.

Other objects, advantages and features of my invention will be readily apparent to those skilled in the art from the following description, the drawings and appended claims.

I have by my invention provided a thermally regenerable fuel cell wherein the feed materials to the electrochemical reaction zone comprise hydrogen and a halogen, the product hydrogen halide produced in the electrochemical reaction zone is thermally converted to hydrogen and halogen, and the hydrogen and halogen recycled to the electrochemical reaction zone as fuel and oxidant feed materials, respectively.

The hydrogen halides produced by the electrochemical reaction of my invention include hydrogen iodide, hydrogen bromide, hydrogen chloride and hydrogen fluoride. Although it is within the scope of this invention to employ hydrogen fluoride, operating conditions are so extreme (high temperatures, etc.) when using hydrogen fluoride, that the use of hydrogen iodide, hydrogen bromide, and hydrogen chloride is preferred. The electrochemical reaction stage of my invention can be any which is capable of carrying out and utilizing the reaction of hydrogen with a halogen to produce an electrical current. Thus, any fuel cell system which is impervious to these materials and which provides an environment which promotes the smooth conversion of the hydrogen and the halogen to a hydrogen halide can be utilized in my invention.

The electrolyte employed in the inventive fuel cell can be aqueous, nonaqueous or solid. The electrolyte can comprise aqueous halide solutions, phosphoric acid, sulfuric acid, zirconium oxide, calcium oxide, ionic exchange membranes, zeolites, and the like.

The electrodes employed in the electrochemical reaction can comprise any resistant and catalytically active conventional electrode material such as a noble metal. Suitable electrode materials include iron, cobalt, nickel, palladium, etc., and copper, silver, and gold, etc. The preparation of these electrodes are well known in the art, and reference is made to U.S. Patent No. 2,276,188, issued Mar. 10, 1942, to Gregor for the description of a typical electrode preparation process.

The hydrogen halide produced in the electrochemical reaction zone is heated in a regeneration zone to at least the dissociation temperature of the hydrogen halide, and more preferably to a temperature at which substantial dissociation of the hydrogen halide is effected, in the presence of a hydrogen-permeable membrane. The dissociated hydrogen is passed through the hydrogen-permeable membrane and recycled as fuel to the electrochemical reaction zone. An oxidant comprising hydrogen halide, free halogen and water is recycled from the regeneration zone to the electrochemical reaction zone as the oxidant.

Figure 1:
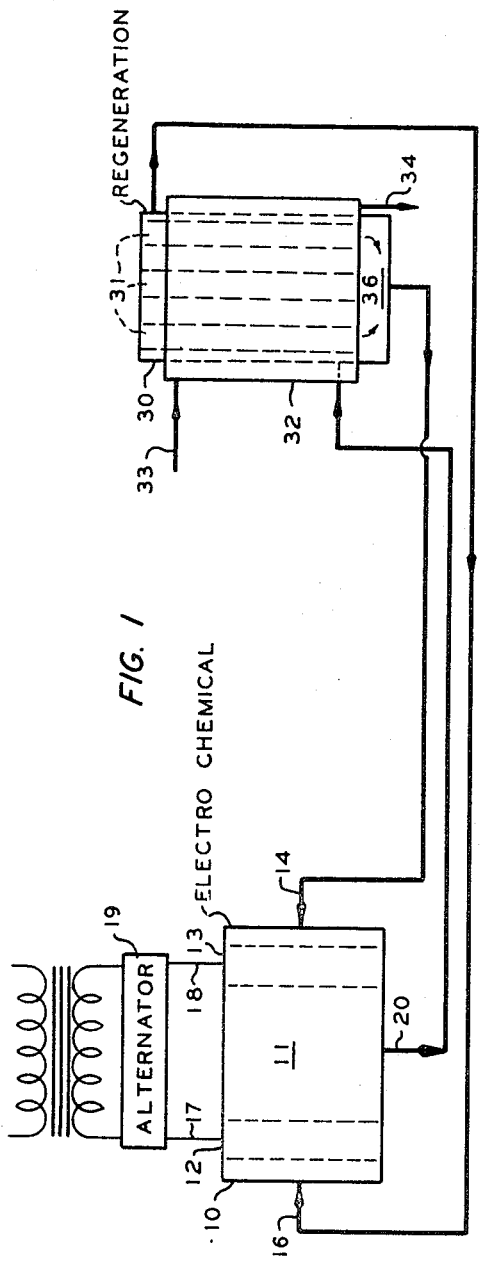
FIGURE 1 is a schematic representation of one embodiment of the invention.

For a better understanding of the invention, reference is now made to FIGURE 1, wherein an electrochemical reaction zone generally designated as 10 is illustrated. Electrochemical reaction zone 10 can comprise a generally rectangular casing or holder made of a suitably inert non-conductive material, such as plastic, e.g., Lucite. Within the center section of the electrochemical reaction zone 10 is a space filled with electrolyte 11. Each of electrodes 12, 13 is connected to suitable conductors 17, 18, respectively, to complete an external circuit. Conductors 17, 18 can be connected to a suitable lead; for example, they can be conducted to an alternator 19 or the like for conversion of the low voltage direct current, e.g., 0.5 to 1.5 volts, to alternating current, which can have its voltage stepped up by a transformer. A plurality of such electrochemical reaction zones can be connected in series or parallel, or a combination thereof.

As illustrated, electrodes 12 and 13 are porous electrodes. A fuel (hydrogen) is passed via conduit means 14 to electrochemical reaction zone 10. An oxidant (hydrogen halide and halogen mixture) is passed via conduit means 16 to electrochemical reaction zone 10. Products of electrochemical reaction are withdrawn from electrochemical reaction zone 10 via conduit means 20.

The hydrogen halide product stream is passed from electrochemical reaction zone 10 via conduit means 20 to a thermal regeneration zone 30. Thermal regeneration zone 30 can comprise a zone containing tubes 31 fabricated from hydrogen-permeable membrane materials such as platinum, iron, palladium, nickel, molybdenum, copper, aluminum and niobium. Alloys of these materials are frequently preferred as hydrogen-permeable membranes and examples of suitable alloys include niobium-palladium and silver-palladium.

Within the halogen halide regeneration zone 30, the hydrogen halide feed is heated to at least the dissociation temperature of the hydrogen halide and preferably to a temperature above 600° F. Although not to be limited thereto, a suitable means of heating the regeneration zone can comprise a jacket 32 surrounding thermal regeneration zone 30. A heating medium such as furnace flue gases pass via conduit means 33 to jacket 32 and is withdrawn from jacket 32 via conduit means 34.

Upon heating the hydrogen halide feed to at least the dissociation temperature, the dissociated hydrogen passes through the hydrogen-permeable membrane material into tubes 31 and from tubes 31 into chamber 36. Hydrogen is withdrawn from the thermal regeneration zone via conduit means 14 and passed as fuel to electrochemical reaction zone 10 in the previously described manner. A hydrogen halide and free halogen stream is withdrawn from thermal regeneration zone 30 via conduit means 16 and passed as the oxidant stream to electrochemical reaction zone 10 via conduit means 16. If it is desired to cool the oxidant stream prior to the passage of said oxidant stream to the electrochemical reaction zone, the oxidant stream can be heat exchanged with the effluent withdrawn from the electrochemical reaction zone.

The passage of the dissociated hydrogen through the hydrogen-permeable membrane is effected by maintaining a pressure differential across the hydrogen-permeable membrane, maintaining the highest pressure m the heating or dissociation zone. The vaporous hydrogen halide feed to the dissociation or heating zone can be associated with a means for compressing the vapors and the hydrogen gas on the other side of the diffusion or hydrogen-permeable wall can be associated with a conventional means for pressure reduction.

It is within the scope of this invention to employ a dissociation catalyst such as platinum black in the regeneration zone. If desired, the dissociation catalyst can be applied as a thin film upon the surface of the hydrogen-permeable membrane adjacent the heating zone.

Although not to be limited thereto, the embodiment illustrated in FIGURE 1 will be described as it is applied to a specific fuel cell system. An electrochemical reaction zone 10 contains a porous graphite anode 13 and a porous graphite cathode 12. An aqueous electrolytic solution 11 containing dissolved hydrogen iodide separates the two electrodes. Electrodes 12 and 13 have deposited thereupon platinum black to enhance the adsorption of the fuel, hydrogen, passed to electrochemical reaction zone 10 via conduit means 14. Free iodine is employed as the oxidant and is passed to electrochemical reaction zone 10 via conduit means 16. The cathode and anode reactions are as follows:

Cathode Reaction

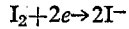

Anode Reaction

A water and hydrogen iodide stream is withdrawn from electrochemical reaction zone 10 via conduit means 20 and passed to the hydrogen-iodide regeneration zone 30. Therein the hydrogen iodide is heated to at least the dissociation temperature of the hydrogen iodide and the feed hydrogen diffused through a bundle of palladium-silver tubes 31. A pure hydrogen stream is withdrawn from regeneration zone 30 via conduit means 14 and passed to electrochemical reaction zone 10. An aqueous hydrogen iodide, free iodine and water containing stream is withdrawn from regeneration zone 30 via conduit means 16 and passed to electrochemical reaction zone 10.

Figure 2:
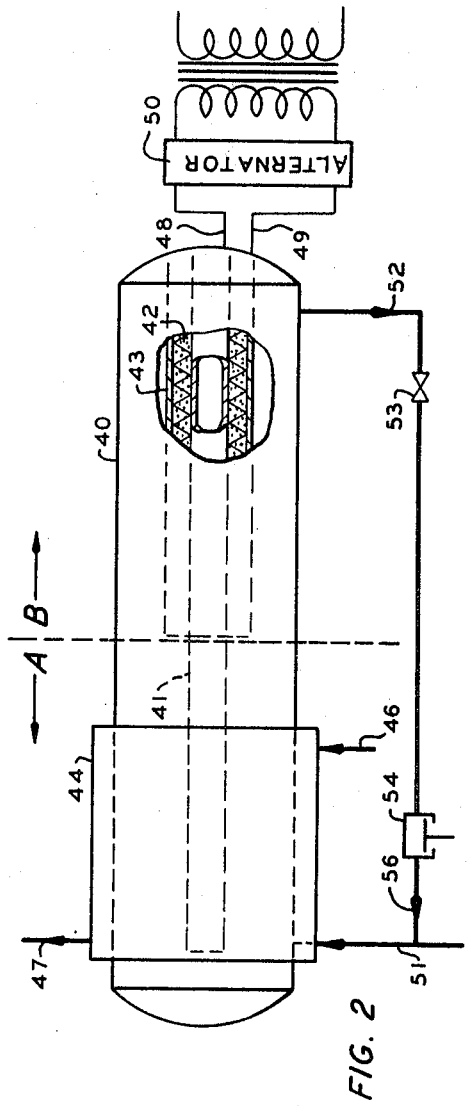
FIGURE 2 is a schematic representation of a second embodiment of the invention.

Referring to FIGURE 2, therein is illustrated a second embodiment of the invention. In the embodiment illustrated in FIGURE 2, the halogen regeneration zone is closely integrated with the electrochemical reaction zone. A vessel 40 contains therein a hydrogen-permeable cylindrically shaped hollow membrane 41. For purposes of describing the invention, vessel 40 will hereinafter be described as encompassing a hot zone A and a cold zone B. The hydrogen-permeable membrane as illustrated extends throughout the cold zone B and extends substantially throughout hot zone A. As illustrated, zone A comprises a thermal regeneration zone and zone B comprises an electrochemical reaction zone. The hydrogen-permeable membrane 41 operates as a hydrogen diffusion membrane within zone A and as the anode within zone B and can comprise silver-palladium or other similar material.

Surrounding the hydrogen-permeable membrane 41 in zone B is an ion exchange membrane 42 such as a conventional polymeric or natural zeolite ion exchange membrane. A metallic cathode 43, such as a platinized platinum gauze, is then placed in contact with the outer diameter of the ion exchange membrane 42. As illustrated in FIGURE 2, cathode 43 is cylindrically shaped, surrounding and adjacent ion exchange membrane 42.

Hot zone A is heated by means of a heating jacket 44 surrounding vessel 40 and the passage of a heating medium such as furnace flue gases via conduit means 46 to jacket 44. The heating medium is withdrawn from jacket 44 via conduit means 47. Although not herein illustrated, it is within the scope of this invention to provide a means for cooling zone B of vessel 40 so as to insure the desired temperature differential between zones A and B. While zone A is operated at an elevated temperature, such as described in connection with zone 30 of FIGURE 1, zone B is intended to operate at relatively low temperatures, for example, less than 200° F.

The hydrogen diffusion tube 41, which can be silver-palladium or other similar material, is preferably coated with a catalytic film such as platinum black to promote or maintain the dissociation equilibrium level in zone A and to promote the electrochemical reaction in zone B.

Electrodes 41 and 43 are connected to suitable conductors 48 and 49, respectively, to complete an external circuit. As described in connection with FIGURE 1, conductors 48 and 49 can be connected to a suitable load; for example, they can be conducted to an alternator 50 or the like, for conversion of the low voltage direct current, e.g., 0.5 to 1.5 volts, to alternating current, which can have its voltage stepped up by transformer.

A hydrogen halide and sufficient water vapor to keep the ion exchange membrane in zone B and in moist condition, is passed via conduit means 51 to zone A of vessel 40. Within zone A, the hydrogen halide is heated to at least the dissociation temperature. The dissociated hydrogen is diffused into the interior of the hydrogen-permeable tube 41. The separated hydrogen migrates to the cold end of tube 41 where it combines with the free halogen to form a halogen halide and in so doing produces an electric current.

Free halogen flows from hot zone A to cold zone B and the hydrogen halide produced in zone B flows to zone A wherein it is heated to at least the dissociation temperature. The required pressure differential across the hydrogen-permeable membrane in zone A is produced by maintaining the described temperature differential between zones A and B, resulting in the hydrogen flowing through the hydrogen-permeable membrane in zone A and from zone A to zone B within tube 41.

It is within the scope of this invention to promote operation of the inventive fuel cell of FIGURE 2 by providing a compressor and conduit means for circulating the gases between cold zone B and hot zone A. Referring again to FIGURE 2, the hydrogen halide produced in zone B can be withdrawn from zone B via conduit means 52 and valve means 53. The withdrawn produced hydrogen halide is compressed by means of conventional compression means 54 and recycled via conduit means 56 and 51 to hot zone A.

As will be evident to those skilled in the art, various modifications of this invention can be made, or followed, in the light of the foregoing disclosure, without departing from the spirit or scope thereof.

I claim:
1. An apparatus for producing electrical energy by an electrochemical reaction comprising, in combination:
   (a) a vessel defining first and second zones;
   (b) a cylindrical, hollow hydrogen-permeable membrane positioned within said vessel so that said membrane extends throughout said first zone and substantially throughout said second zone, the portion of said membrane in said first zone operating as an anode and the portion of said membrane in said second zone operating as a hydrogen diffusion membrane;
   (c) an electrolytic material surrounding and in contact with the outer diameter of the portion of said membrane located in said first zone;
   (d) a porous, metallic cathode surrounding and in contact with the outer diameter of said electrolytic material;
   (e) means for introducing a hydrogen halide and water vapor into said second zone;
   (f) means for heating said second zone to a temperature above the dissociation temperature of said hydrogen halide;
   (g) electrical conducting means connecting the portion of said membrane in said first zone to an external electrical circuit; and
   (h) electrical conducting means connecting said cathode to an external electrical circuit.

2. The apparatus according to claim 1 wherein said heating means comprises a jacket surrounding at least a part of the section of said vessel defining said second zone and means for passing a heating medium to said jacket and for withdrawing said heating medium from said jacket.

3. The apparatus of claim 2 wherein said hydrogen-permeable membrane is a silver-palladium membrane, said hydrogen-permeable membrane is coated with a catalytic film of platinum black, said electrolyte is a polymeric ion exchange membrane, and said cathode is a platinized platinum gauze.

4. The apparatus according to claim 2 further comprising a means for cooling said first zone.

5. The apparatus according to claim 1 further comprising a conduit means communicating between said first zone and said second zone for circulating the gases between said first zone and said second zone.

References Cited
UNITED STATES PATENTS

| | | | |
|---|---|---|---|
| 353,141 | 11/1886 | Kendall | 136—86 |
| 3,080,442 | 3/1963 | Hobart | 136—86 |
| 3,088,990 | 5/1963 | Rightmire et al. | 136—86 |
| 3,092,517 | 6/1963 | Oswin | 136—86 |
| 3,110,631 | 11/1963 | Carlton | 136—86 |
| 3,148,089 | 9/1964 | Oswin | 136—86 |
| 3,177,097 | 4/1965 | Beals | 136—86 |
| 3,192,070 | 6/1965 | Tragert et al. | 136—86 |
| 3,259,523 | 7/1966 | Faris et al. | 136—86 |

ALLEN B. CURTIS, *Primary Examiner.*